July 24, 1928.
F. NOTZ ET AL
1,678,194
PACKING RETAINER FOR DOUGH MIXING MACHINES AND THE LIKE
Filed July 23, 1925
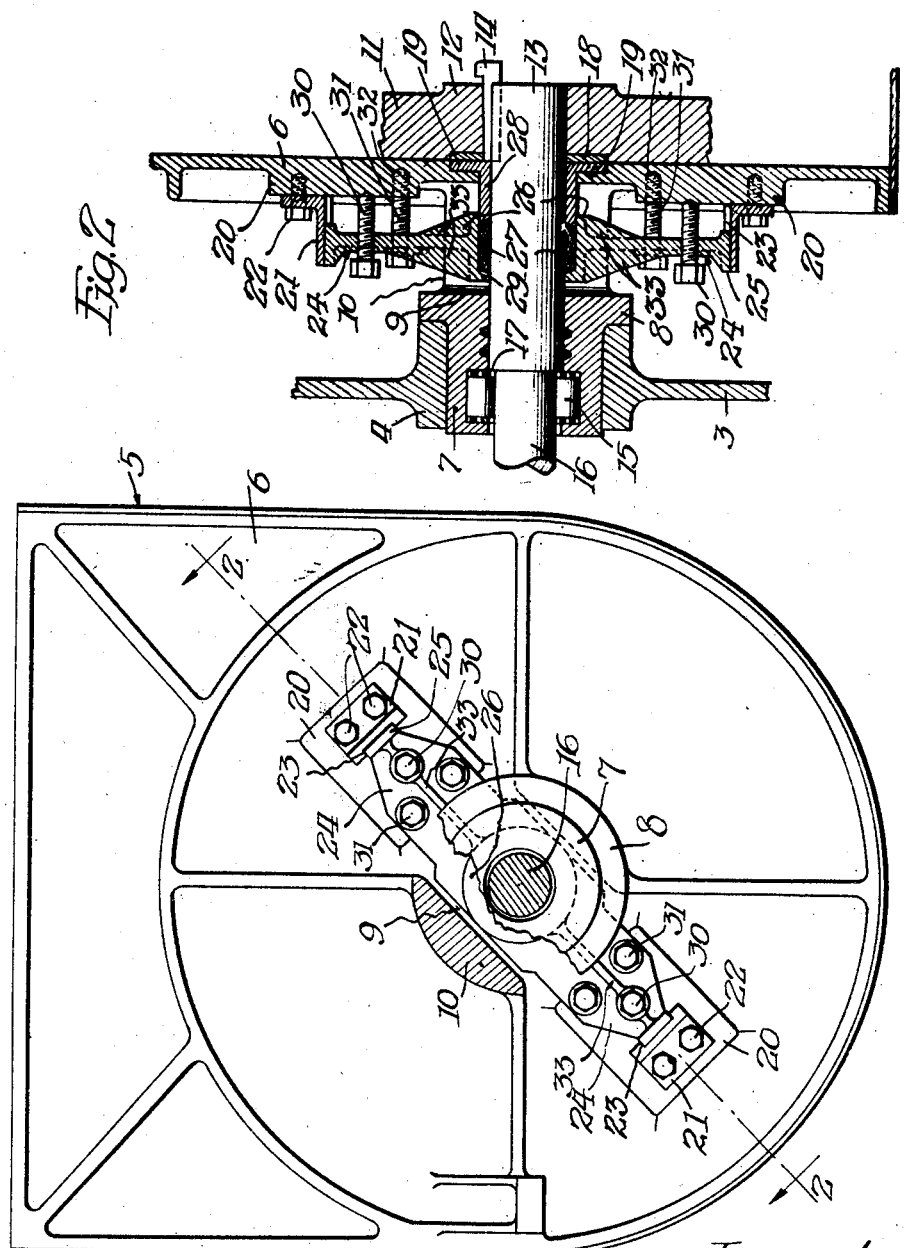
Inventors:
Felix Notz,
George Royan,
by Fisher, Fowle, Clapp & Soans, Attys.

Patented July 24, 1928.

1,678,194

UNITED STATES PATENT OFFICE.

FELIX NOTZ AND GEORGE ROYAN, OF CHICAGO, ILLINOIS, ASSIGNORS TO AMERICAN OVEN & MACHINE COMPANY, OF CHICAGO, ILLINOIS, A CORPORATION OF ILLINOIS.

PACKING RETAINER FOR DOUGH-MIXING MACHINES AND THE LIKE.

Application filed July 23, 1925. Serial No. 45,492.

This invention relates to dough mixing machines and the like and more particularly to a novel bearing construction and mixing receptacle or drum end packing retainer for such machines as are employed for mixing dough and like plastic material.

The type of machine to which the invention relates and for which the novel bearing construction and packing retainer is especially adapted to be employed is shown and described in our co-pending application, filed July 23rd, 1925, under Serial No. 45,491, although not limited to such application.

Among the objects of the invention are to positively prevent the dough from passing into the bearings or working parts from within the mixing chamber or drum, and the lubricant from leaking or escaping into the dough and mixing frame and beater and spoiling the batch of dough; to provide a novel shaft and mixing receptacle or drum end packing and packing retainer for accomplishing the foregoing objects; to provide novel means for tightening the packing and adjusting the same with respect to the mixing receptacle or drum, and for facilitating repairing and replacement of the packing, and generally to improve such structures and simplify and facilitate the manufacture and assemblage thereof.

The invention also consists in certain other features of novelty to be hereinafter more fully described, illustrated in the accompanying drawings and particularly pointed out in the claims at the end of the specification.

In the drawings:—

Fig. 1 is a sectional elevation of a dough mixing machine equipped with the novel bearing and packing retainer, the housing or frame of the machine being omitted and part of the structure being broken away and in section to more particularly illustrate the structure, and Fig. 2 is a diametrically sectional view taken on the plane of the section line 2—2 of Fig. 1.

Referring to the drawings in detail, 3 designates the inner wall of one of the housings of the frame of the machine having bearing sleeves 4, of which only one is shown for illustrating the construction and application of the invention at one side of the machine.

The mixing receptacle or drum is designated at 5 and has one of its side walls 6 equipped with the novel bearing and packing retainer, the receptacle or drum being pivotally mounted to be tilted in the housing in any preferred way such as described in our co-pending application above referred to. In the construction shown, the side wall or drum end 6 is provided with a hub extension 7 which has pivotal bearing in the sleeve 4 and is provided with a shoulder 8 engaging the inner end of the sleeve to take up end thrust. The hub is further provided with a diametrical slot 9, forming diametrically opposed spaced webs 10, for the purpose of accommodating the adjustable packing retainer to be hereinafter more fully described.

The mixing frame or beater of the machine is designated at 11 and is illustrated as being of that form employing a pair of short shafts, although it is to be understood that the employment of one or two shafts for revolubly mounting the mixing frame is optional. In the form shown, the mixing frame has a sleeve portion 12 which is keyed to the short shaft 13 as indicated at 14. The shaft 13 extends across the slot 9 and is journaled in the hub 7 for free rotation. In order that the shaft may turn without undue friction, the hub 7 is provided with anti-friction bearings 15 preferably of the roller bearing type and the shaft 13 has a reduced portion 16 providing a shoulder 17 engaging the bearings to take up end thrust and resist axial displacement of the mixing frame and shafts within the mixing receptacle or drum.

An annular bearing member or plate 18 is mounted in a recess in the outer face of the mixing frame 11 at the hub thereof around the shaft 13 and a flanged packing gland and drum end bushing 19 are mounted on the shaft 13 with the flange thereof seated in a corresponding annular recess or depression in the opposed inner face of the side wall 6 of the mixing receptacle or drum so that when these parts are brought into bearing contact, a tight and effective seal against the escape of lubricant into the mixing receptacle or against the passage of the dough into the bearings of the machine is provided.

The side wall or drum end 6 is provided at diametrically opposite points in line with the slot 9 with bosses 20 to the outer portions of which angular lugs 21 are secured as by means of screws 22. The outstanding portions of these lugs extend at right angles to the plane of the wall 6 and each is provided with a machined guide slot or groove 23. Retainers 24 have reduced heads 25 at their outer ends slidable in the grooves 23 parallel to the axis of the shaft 13 and the inner ends of the retainers are enlarged and prolonged longitudinally of the shaft as well as recessed to conform to the curvature thereof as indicated at 26.

A packing 27 is interposed between the semi-circular portions of the retainers and the shaft and is mounted on the shaft between the undercut outer end of the sleeve portion 28 of the gland 19 and flanges 29 at the outer ends of the retainers. The two retainers extend into the slot 9 at diametrically opposite sides of the shaft 13 and are disposed in alignment so as to encircle the shaft and packing to permit application, adjustment or removal of the retainers with convenience.

Adjusting screws 30 are engaged in threaded openings in the retainers and contact with the outer surface of the wall 6 to permit adjustment of the retainers with respect to the packing. These screws coact with retaining screws 31 which are rotatably mounted in the retainers instead of having threaded engagement therewith and are threaded in sockets 32 in the wall 6. Thus, the screws 31 serve to draw the retainers toward the wall 6 and permit the packing 27 and the bearing contact between the plates or bushings 18 and 19 to be adjusted so that the passage of dough between the parts and into the bearings as well as the leakage of lubricant from the bearings into the mixing receptacle or drum, is effectively prevented. It will also be apparent that the adjusting screws 30 will serve to regulate this tension and pressure and will effectively lock the retainers in adjusted position so that the likelihood of the parts becoming loose during the operation of the machine is avoided.

While we do not desire to be limited to the exact arrangement shown, it is preferable to employ one adjusting screw in connection with each retainer, each of the retainers having a central longitudinal web or rib 33 to reinforce or stiffen the same at the inside and outside, whereby the parts may withstand the pressure applied thereto and maintain their adjustment.

It is also preferable to employ two tightening screws 31 on each retainer and as shown, the tightening screws are located inwardly of the adjusting screws and equidistantly spaced at either side of the adjusting screws and the reinforcing webs 33. The extended end 16 of the shaft 13 is adapted for connection with suitable driving means as shown by co-pending application above referred to, thus mounting the packing retainer on the driving end of the mixing frame or beater in such a manner as to facilitate assemblage and mounting of the parts as well as having access to the bearings for the purpose of repairing or renewal as well as disassemblage of the machine. But it is to be understood that the retainer may be mounted on the opposite shaft should it be so desired. It will also be obvious that by removing the securing screws 22, the retainer or sections thereof may be dismounted after unscrewing the tightening screws 31 from their sockets 32, whereby the retainers may be displaced radially through the slot 9 from the shaft 13 to permit access to the packing and bearing for any desired purpose as well as in disassembling the parts.

While we have shown and described our invention in a preferred form, we are aware that various changes and modifications may be made without departing from the principles of our invention, the scope of which is to be determined by the appended claims.

We claim as our invention:

1. A packing device of the type described comprising a pair of members adapted for rotational movement with respect to each other, a packing retainer, means carried by one member to positively support the packing retainer, and said means and said packing retainer being formed with relatively sliding and interengaging elements having smooth contacting surfaces thereby to permit primary adjustment of said packing retainer with respect to said members, other means independent of said interengaging means for adjusting said retainer, and means for locking said retainer in adjusted position.

2. A packing device of the type described comprising a pair of members adapted for rotational movement with respect to each other, a bearing member carried by one of said members, a packing gland on the other member adjacent said bearing member, a packing retainer carried by said other member, packing in said retainer, said packing gland having a bearing face cooperating with said bearing member, means carried by said other member to positively support the packing retainer, and said means and said packing retainer being formed with relatively sliding and interengaging elements having smooth contacting surfaces thereby to permit primary adjustment of said packing retainer with respect to said members, other means independent of said interengaging means for adjusting the retainer and drawing the same against the packing thereby to force the bearing face of the gland against the bearing member, and means for locking the retainer in adjusted position.

3. A packing device of the type described comprising a pair of members adapted for rotational movement with respect to each other, a bearing member carried by one of said members, a packing gland on the other member adjacent said bearing member and having a bearing face cooperating with said bearing member, a packing retainer carried by said other member, packing in said retainer, outstanding guide lugs carried by said latter member and having guideways slidably receiving the outer ends of said retainer for movement parallel to the axis of the first named member, tightening screws carried by the retainer and having threaded engagement with said member for drawing the retainer against the packing and forcing the bearing face of the gland against the bearing member, and adjusting screws threaded through the retainer and coacting with said other member to lock the retainer in adjusted position.

4. A packing device of the class described, comprising a pair of members adapted for rotation with respect to each other, one of said members having a bearing portion, a packing gland on the other member adapted to engage the bearing portion, a packing retainer on the latter member, guideways on the latter member receiving the retainer for sliding movement axially, means for drawing the retainer against the packing and forcing the packing gland against the bearing portion, and means carried by the retainer and engaging the latter member to hold the retainer in adjusted position.

FELIX NOTZ.
GEORGE ROYAN.